(12) United States Patent
Quehenberger

(10) Patent No.: US 10,286,780 B2
(45) Date of Patent: May 14, 2019

(54) METHOD FOR CONTROLLING A MOTOR VEHICLE OPERATED IN ALL-WHEEL DRIVE AT TIMES

(71) Applicant: MAGNA POWERTRAIN GMBH & CO KG, Lannach (AT)

(72) Inventor: Johannes Quehenberger, Raaba (AT)

(73) Assignee: MAGNA POWERTRAIN GMBH & CO KG, Lannach (AT)

(*) Notice: Subject to any disclaimer, the term of this patent is extended or adjusted under 35 U.S.C. 154(b) by 740 days.

(21) Appl. No.: 14/783,577

(22) PCT Filed: Apr. 3, 2014

(86) PCT No.: PCT/EP2014/005672
§ 371 (c)(1),
(2) Date: Oct. 9, 2015

(87) PCT Pub. No.: WO2014/166819
PCT Pub. Date: Oct. 16, 2014

(65) Prior Publication Data
US 2016/0059696 A1 Mar. 3, 2016

(30) Foreign Application Priority Data

Apr. 9, 2013 (DE) .................. 10 2013 206 242

(51) Int. Cl.
*B60K 5/02* (2006.01)
*B60K 23/08* (2006.01)
(Continued)

(52) U.S. Cl.
CPC .............. *B60K 23/08* (2013.01); *B60K 17/35* (2013.01); *B60K 5/02* (2013.01); *B60K 5/04* (2013.01);
(Continued)

(58) Field of Classification Search
CPC .......... B60K 23/08; B60K 17/35; B60K 5/04; B60K 5/02; B60K 17/344;
(Continued)

(56) References Cited

U.S. PATENT DOCUMENTS 6,578,692 B2   6/2003   Porter
2010/0089685 A1   4/2010   Quehenberger et al.
(Continued)

FOREIGN PATENT DOCUMENTS

DE   102008037886 A1   2/2010
DE   202009007977 U1   2/2010
(Continued)

OTHER PUBLICATIONS

International Search Report dated Dec. 18, 2014 from International PCT Patent Application Serial No. PCT/EP2014/05672.

*Primary Examiner* — David J Hlavka
(74) *Attorney, Agent, or Firm* — Dickinson Wright PLLC

(57) ABSTRACT

A method for controlling a motor vehicle (1) operated in all-wheel drive at times, by means of a control unit (3), wherein the motor vehicle comprises a drive unit (11), a primary drive axle (14) permanently driven by the drive unit (11), a secondary drive axle (24), a torque transmission train (17, 17.1) for transmitting the torque of the drive unit (11) to the secondary drive axle (24), and a disconnect clutch (15) for coupling the secondary drive axle (24) to and uncoupling same from the drive unit (11), wherein the control unit (3) can actuate the disconnect clutch (15) via a first actuating unit (16), characterized by the following steps
determining an all-wheel requirement for the motor vehicle from input signals
if there is a predetermined all-wheel requirement, preparing an all-wheel operation, wherein the disconnect clutch (15) is not closed.

23 Claims, 5 Drawing Sheets

(51) Int. Cl.
*B60K 17/35* (2006.01)
*B60K 17/344* (2006.01)
*B60K 17/346* (2006.01)
*B60K 5/04* (2006.01)

(52) U.S. Cl.
CPC ........ *B60K 17/344* (2013.01); *B60K 17/3462* (2013.01); *B60K 2023/0858* (2013.01); *B60Y 2300/73* (2013.01); *B60Y 2400/421* (2013.01)

(58) Field of Classification Search
CPC ........ B60K 2023/0858; B60K 17/3462; B60Y 2400/421; B60Y 2300/73
See application file for complete search history.

(56) References Cited

U.S. PATENT DOCUMENTS

| | | | | |
|---|---|---|---|---|
| 2010/0274456 A1* | 10/2010 | Kondo | .................. | B60K 23/08 |
| | | | | 701/69 |
| 2012/0234120 A1* | 9/2012 | Fukuda | ............... | B60K 17/344 |
| | | | | 74/405 |
| 2013/0220722 A1* | 8/2013 | Mita | ..................... | B60K 17/34 |
| | | | | 180/249 |
| 2013/0303326 A1* | 11/2013 | Downs | .................. | F16H 48/22 |
| | | | | 475/221 |
| 2016/0229405 A1* | 8/2016 | Shimizu | ............. | B60W 30/182 |

FOREIGN PATENT DOCUMENTS

| | | |
|---|---|---|
| DE | 102009005410 A1 | 7/2010 |
| DE | 102010013007 A1 | 10/2010 |

\* cited by examiner

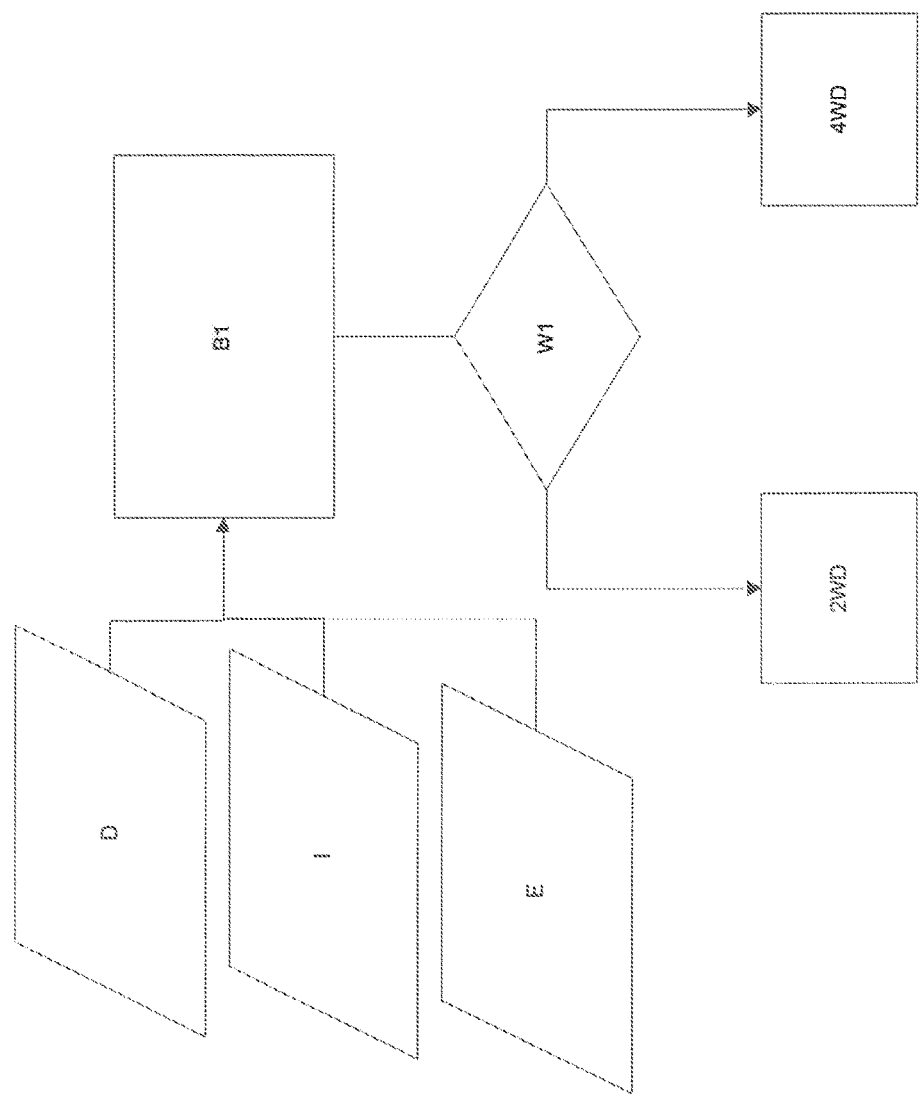

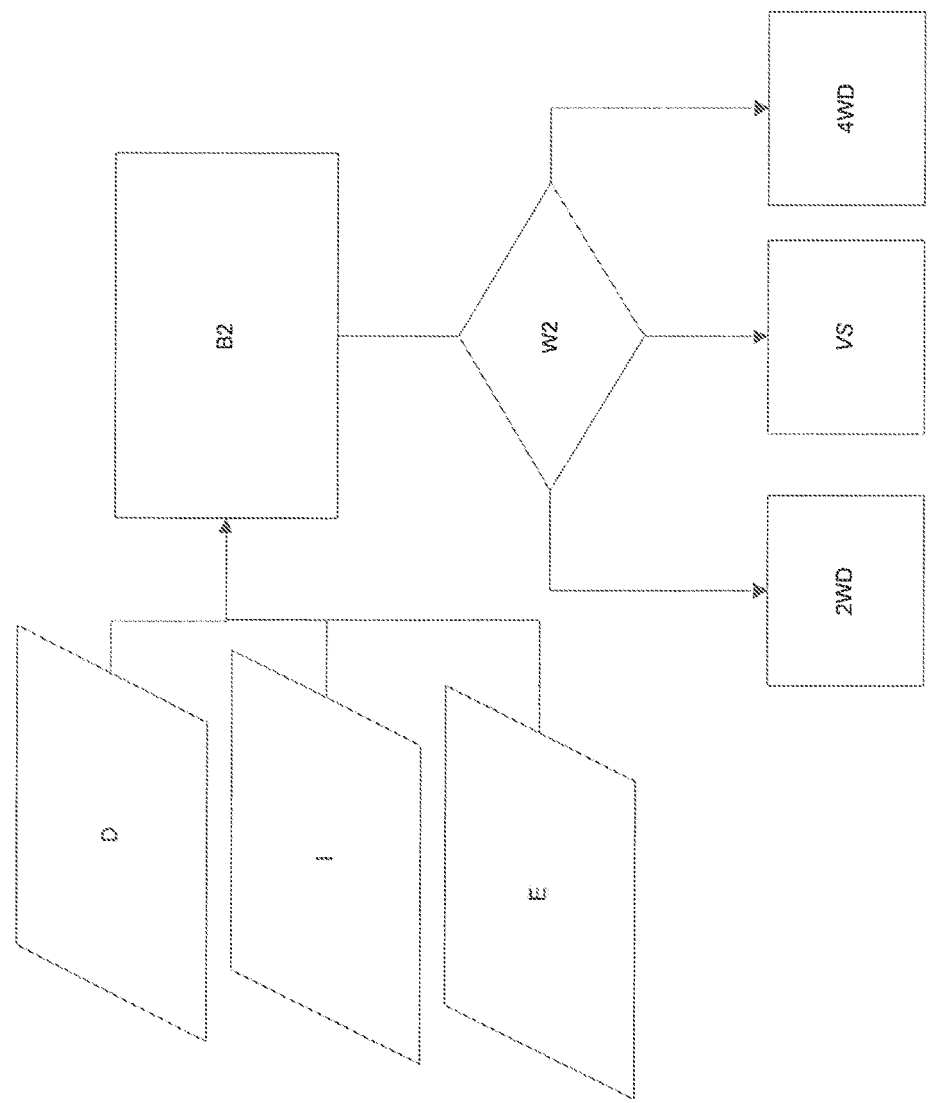

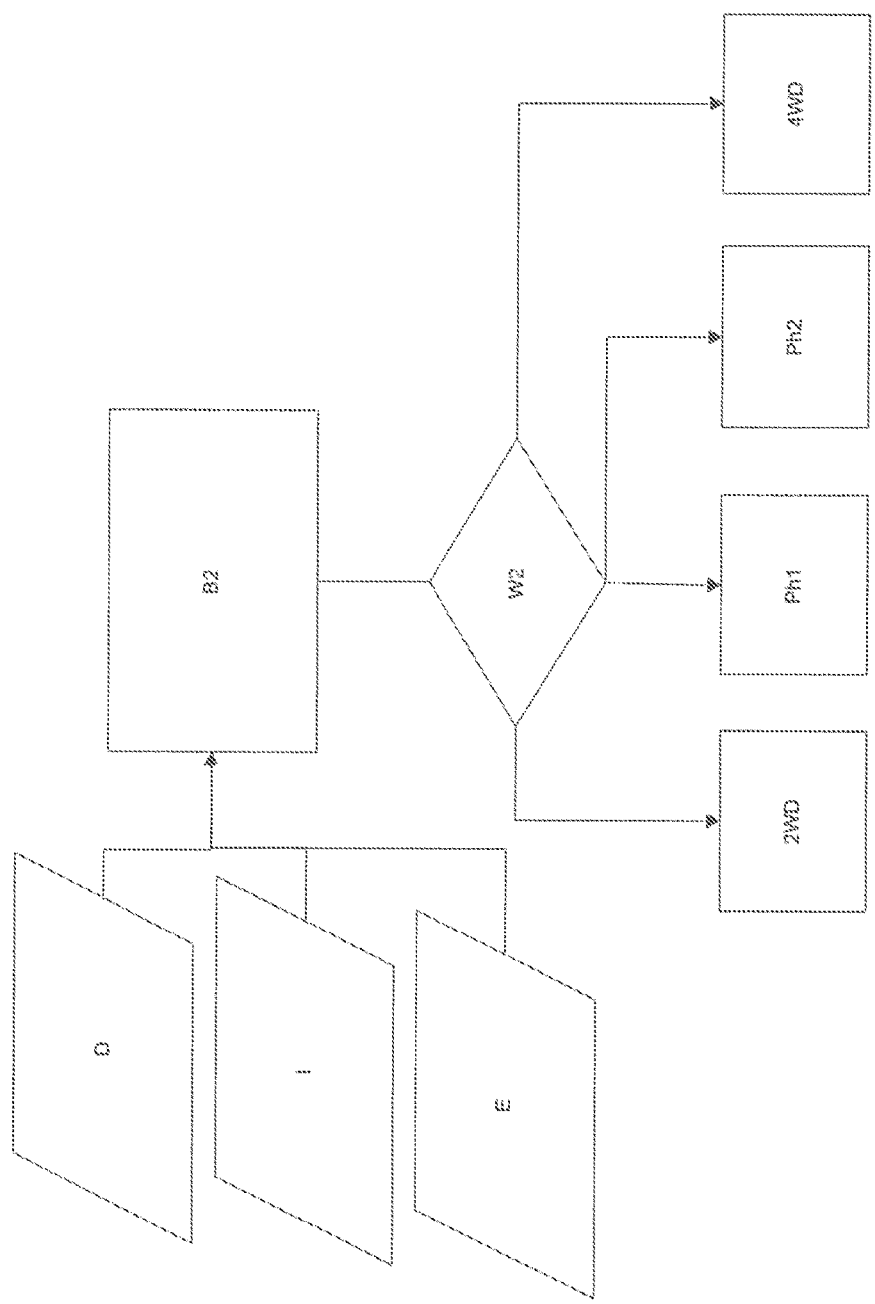

METHOD FOR CONTROLLING A MOTOR VEHICLE OPERATED IN ALL-WHEEL DRIVE AT TIMES

CROSS-REFERENCE TO RELATED APPLICATION

This application is a National Stage of International Application No. PCT/EP2014/056752 filed Apr. 3, 2014 and which claims the benefit and priority of German Patent Application No. DE 102013206242.7 filed Apr. 9, 2013, the entire disclosures of which are incorporated herein in their entirety by reference.

FIELD OF THE INVENTION

The invention relates to a method for controlling a motor vehicle operated in all-wheel drive at times, by means of a control unit. For this purpose, the motor vehicle comprises a drive unit, a primary drive axle permanently driven by the drive unit, a secondary drive axle, a torque transmission train for transmitting the torque of the drive unit to the secondary drive axle, and a disconnect clutch for coupling the secondary drive axle to and decoupling same from the drive unit. The control unit can actuate the disconnect clutch via a first actuating unit.

PRIOR ART

A method for axle disconnect is known from DE 10 2010 013 007 A1. This system includes monitoring a plurality of parameters, determining whether an occurrence of a traction event and/or a stability event is imminent based on at least one of the parameters, wherein the stability event is determined based on a first set of parameters, and the traction event is determined based on a second set of parameters that includes fewer parameters than the first set of parameters, and the axle disconnect device is regulated to an engaged position if the occurrence of the at least one traction event and the stability event is imminent.

A disadvantage of known systems for coupling and decoupling a secondary axle is that coupling operations last for a long time and are sometimes carried out when this is not actually required, and therefore vehicle components which are involved are stressed more than necessary.

SUMMARY OF THE INVENTION

It is an object of the invention to specify a method for controlling a motor vehicle operated in all-wheel drive at times and a corresponding motor vehicle with a control unit which carries out a method of this type such that coupling operations can be carried out more rapidly and less frequently and such that the driving comfort is increased and the wear of vehicle components is reduced.

The object is achieved by a method for controlling a motor vehicle operated in all-wheel drive at times, by means of a control unit, wherein the motor vehicle comprises a drive unit, a primary drive axle permanently driven by the drive unit, a secondary drive axle, a torque transmission train for transmitting the torque of the drive unit to the secondary drive axle, and a disconnect clutch for coupling the secondary drive axle to and uncoupling same from the drive unit, wherein the control unit can actuate the disconnect clutch via a first actuating unit, characterized by the following steps determining an all-wheel requirement for the motor vehicle from input signals if there is a predetermined all-wheel requirement, preparing an all-wheel operation, wherein the disconnect clutch is not closed.

According to the invention, it is therefore determined whether there is a requirement for an all-wheel operation of the vehicle. If there is a certain requirement—for example no urgent necessity, since there is not yet any slip at the wheels of the vehicle, but it should be expected that connection of the secondary drive axle will soon be required, then, according to the invention, by means of specific measures the connection of the drive of the second drive axle, i.e. the closing of the disconnect clutch, is prepared, but the disconnect clutch is not yet closed.

The coupling of the secondary drive axle to and decoupling of same from the drive unit by the disconnect clutch can take place in particular by coupling the torque transmission train to and decoupling same from the drive unit or else by coupling the secondary axle to and decoupling same from the torque transmission train.

The preparation of the all-wheel operation takes place in particular by the fact that synchronizing of the torque transmission train is prepared or is carried out, but without the disconnect clutch being closed. A subsequent full connection of the secondary axle by closing the disconnect clutch can therefore take place more rapidly and can also be omitted—should this later no longer be required.

Since the torque transmission train represents relatively high inertia which has to be synchronized with the primary drive axle before the switching into the all-wheel drive, a time delay arises which is greatly reduced by presynchronizing the secondary drive axle and the torque transmission train thus permitting more rapid switching into the all-wheel drive, which, in turn, leads to improved driving comfort.

The primary drive axle is the drive axle which is permanently driven. A secondary drive axle is understood as meaning a drive axle which can be connected if the need arises.

The drive unit is preferably an internal combustion engine. Alternatively, the drive unit can be an electric motor. A combination of the two drive units, also known as a hybrid drive, is also possible.

The drive unit produces a driving torque which is preferably transmitted to the primary drive axle via a transmission. The primary drive axle is permanently connected to the drive unit.

The permanently driven drive axle is preferably the front axle. It is frequently the rear axle in the case of motor vehicles in which the drive unit is installed longitudinally.

In order to connect the primary drive axle to the secondary drive axle, a torque transmission train is arranged between the two drive axles wherein the torque transmission train is preferably of articulated design and is referred to as propeller shaft.

The torque transmission train is connected, preferably in an articulated manner, at one end to a power-take-off unit or else power-transfer unit, PTU for short, which is arranged in the region of the primary drive axle, and is connected at the other end in an articulated manner to a differential transmission which is arranged in the region of the secondary drive axle. This embodiment is used in the case of internal combustion engines installed transversely in the vehicle, i.e. the arrangement of the row of cylinders is transverse to the direction of travel. The PTU essentially consists of a bevel gear transmission, preferably with a hypoid drive, that is to say, the axes of drive wheel and ring gear are offset, i.e. do not intersect. The propeller shaft can thus be located lower down, which results in a slightly lower center of gravity of the vehicle.

The PTU serves to connect and disconnect the torque transmission train and comprises the disconnect clutch. In a preferred embodiment, the PTU is arranged between the differential of the primary torque transmission train and ring gear of the bevel drive.

The motor vehicle preferably also comprises a second clutch device for presynchronizing the torque transmission train, wherein the control unit can actuate the second clutch device via a second actuating unit, wherein the preparation of an all-wheel operation takes place via this second actuating unit. Coupling of the torque transmission train to a rotating shaft, for example the secondary drive axle, is therefore prepared or carried out in accordance with the operation of the second clutch device. By this means, synchronizing of the torque transmission train is provided or is carried out, but without the disconnect clutch being actuated.

The torque transmission train is preferably connected at a first end to the PTU. At the other end, the torque transmission train is then preferably connected in an articulated manner to a differential transmission. The differential transmission is arranged between the drive shafts of the secondary drive axle. The differential transmission has the second clutch device. The torque provided by the disconnect clutch can be transmitted via the torque transmission train to the second clutch device. The second clutch device, which is connected to the differential transmission of the secondary drive axle, serves for connecting the secondary drive axle to the differential transmission or for connecting the differential transmission to the drive wheels of the rear axle and is actuable by the second actuating unit, wherein, depending on the actuating force, the second clutch device can correspondingly transmit a desired torque to the secondary drive axle via the drive shafts thereof. The second clutch device can therefore be designed as a switchable differential.

In an embodiment according to the invention, the second clutch device is designed as a twin RDM (twin rear drive module), wherein the twin RDM is constructed from two clutches, wherein one clutch is in each case assigned to one drive wheel of the secondary drive axle. This makes it possible to omit the differential on the secondary drive axle since the optimum torque is transmitted to the respective drive wheel via the twin RDMs, which are designed as multi-disk clutches, and via the actuation of the respective disk assembly. Depending on requirements, the control unit actuates one clutch or both clutches, wherein the twin RDMs each have one actuating unit per clutch. The use of twin RDMs is known from the prior art and is described, inter alia, in U.S. Pat. No. 6,578,692 B2.

In a further embodiment, the second clutch device is designed as a multi-disk clutch and is rotatably connected via a clutch cage to a driving gearwheel, wherein the multi-disk clutch is arranged in the PTU. The driving gearwheel is preferably connected to the torque transmission strand via a countershaft, which has a ring gear, via a pinion. The PTU is connected to a differential transmission of the primary drive axle. The differential transmission is connected to a multiplier of the drive unit.

In the actuated state of the second clutch device, a driving torque or torque is transmitted from the drive unit via the driving gearwheel, which is connected to the clutch cage, and via the bevel gear transmission to the torque transmission train. The second clutch device is actuated by an actuating force of an actuating unit, wherein the actuation preferably takes place electromagnetically, electromechanically or hydraulically. All actuating units known to a person skilled in the art can be used.

In a further embodiment, the second clutch device is arranged in a distribution transmission, wherein distribution transmissions are required for transmitting a torque of the drive unit in the case of longitudinally installed internal combustion engines. The second clutch device is designed as an "on-demand clutch". On-demand clutches are preferably designed as multi-disk clutches.

In one embodiment, the second clutch device is designed as a dog clutch.

The disconnect clutch is preferably designed as a dog clutch.

The disconnect clutch can also be designed as a multi-disk clutch, synchronized clutch, roller clutch or other torque-transmitting separating mechanism.

The actuation of the disconnect clutch preferably takes place electromagnetically, electromechancally or hydraulically, wherein the control unit triggers the actuation in accordance with the detected and evaluated signals and parameters.

The determination of the all-wheel requirement is preferably in the form of determining a probability of an all-wheel requirement in at least three categories, namely "low", "medium" and "high", wherein the predetermined all-wheel requirement corresponds to the "medium" category. The preparation of the all-wheel operation without closing the disconnect clutch therefore takes place in the event of a medium probability of all-wheel requirement—if the preparation has not in any case already taken place previously.

In the "low" category, the disconnect clutch is preferably open or remains open. If the "low" category is determined, the motor vehicle is switched into or maintained in the two-wheel mode, if said motor vehicle was already in the two-wheel mode.

In the "high" category, the disconnect clutch preferably remains closed, or, if said disconnect clutch has not yet been closed, in particular via the second actuator unit, an all-wheel operation is prepared if required and the disconnect clutch is closed. In the event of a high or certain requirement for an all-wheel drive, the latter can be completely produced irrespective of whether preparation measures, such as synchronizing of the torque transmission train, have already taken place earlier or have not yet taken place.

Since the synchronizing has generally already taken place before the actual all-wheel requirement is necessary, the secondary drive axle can be connected without a time delay, as a result of which an improved driving comfort is achieved.

The preparation of an all-wheel operation preferably takes place in such a manner that, in particular via the second clutch device, presynchronizing of the torque transmission train with the primary drive axle takes place.

The presynchronizing particularly preferably takes place by virtue of the fact that, by closing the second clutch device, a rotational speed is at least partially transmitted from wheels arranged on the secondary drive axle to the secondary drive axle and the torque transmission train.

In one embodiment, the preparation of an all-wheel operation takes place in such a manner that passage through an air gap, in particular in the second clutch device, takes place.

In one embodiment, the preparation of an all-wheel operation takes place in such a manner that a motor-pump unit, in particular for actuating the second clutch device, is started.

In a multi-stage method according to the invention, the determination of the all-wheel requirement can take place in the form of determining a probability of an all-wheel requirement in at least four categories, namely "low", "medium1", "medium2" and "high", and, if the "medium1" or "medium2" category is present, different steps can be carried out for preparing an all-wheel operation, and the disconnect clutch (15) is in each case not closed. According to the invention, a differentiation can therefore be made between two or more medium categories or states relevant to the all-wheel requirement, i.e. even a multiplicity of further intermediate stages, wherein, in the various medium states, the switching over to all-wheel operation is prepared in various ways, but is not yet finished.

In a multi-stage method according to the invention, the determination of the all-wheel requirement can take place in the form of determining a probability of an all-wheel requirement in at least four categories, namely "low", "medium1", "medium2" and "high", and, if the "medium1" category is present, passage through an air gap, in particular in the second clutch device, can take place, or a motor-pump unit, in particular for actuating the second clutch device, can be started, and, if the "medium2" category is present, presynchronizing of the torque transmission train with the primary drive axle can take place, in each case if said measures have not already been carried out previously.

The input signals for determining the all-wheel requirement for the motor vehicle preferably comprise actual data of the vehicle, in particular wheel rotation speeds, a steering angle, a yaw rate, a roll angle, a pitch angle, lateral acceleration, longitudinal acceleration, a position of a driving mode switch, a position of an ESC/ASR/ASC/ABS/ESP switch, a gas pedal position, a brake pedal position, an ambient temperature, a position of a cruise control switch, data from a distance radar, a transmission shift position, a throttle position, an engine speed and/or an engine torque.

Signals from light sensor and rain sensor, but also tire pressure sensors can likewise be used, for example, for determining the current driving state or the driving state which can be expected.

The input signals for determining the all-wheel requirement for the motor vehicle can comprise external information, such as data from car-to-car communication and/or internet or satellite data.

The input signals can also use car-to-X communication signals, wherein vehicles and infrastructure are electronically networked together. This permits the direct exchange of information between vehicles and between vehicles and traffic infrastructure such as, for example, light signal systems. Accordingly, car-to-X is a comprehensive communication network in which every traffic participant can be involved. The designation "X" stands for an extended communication, for example emergency call exchanges and devices for traffic control.

The input signals for determining the all-wheel requirement for the motor vehicle can comprise temporally preceding driving events. On the basis of the preceding events, the control unit attempts to calculate subsequent events and correspondingly to determine the probability of the requirement for an all-wheel drive.

The object according to the invention is also achieved by a motor vehicle with a control unit, wherein the motor vehicle comprises a drive unit, a primary drive axle, a torque transmission train, a disconnect clutch for coupling the torque transmission train to and decoupling same from the drive unit, a secondary drive axle, preferably also a second clutch device for coupling the torque transmission train to and decoupling same from the secondary drive axle, wherein the control unit can actuate the disconnect clutch via a first actuating unit and can preferably also actuate the second clutch device via a second actuating unit, wherein the control unit is set up in order to carry out one of the methods described above.

BRIEF DESCRIPTION OF THE DRAWINGS

The invention is described by way of example below with reference to the drawings.

FIG. 3 shows a flow diagram of a method according to the prior art.

FIG. 4 shows a flow diagram of a method according to the invention.

FIG. 5 shows a flow diagram of a further method according to the invention.

DETAILED DESCRIPTION OF THE INVENTION

Figure 1:
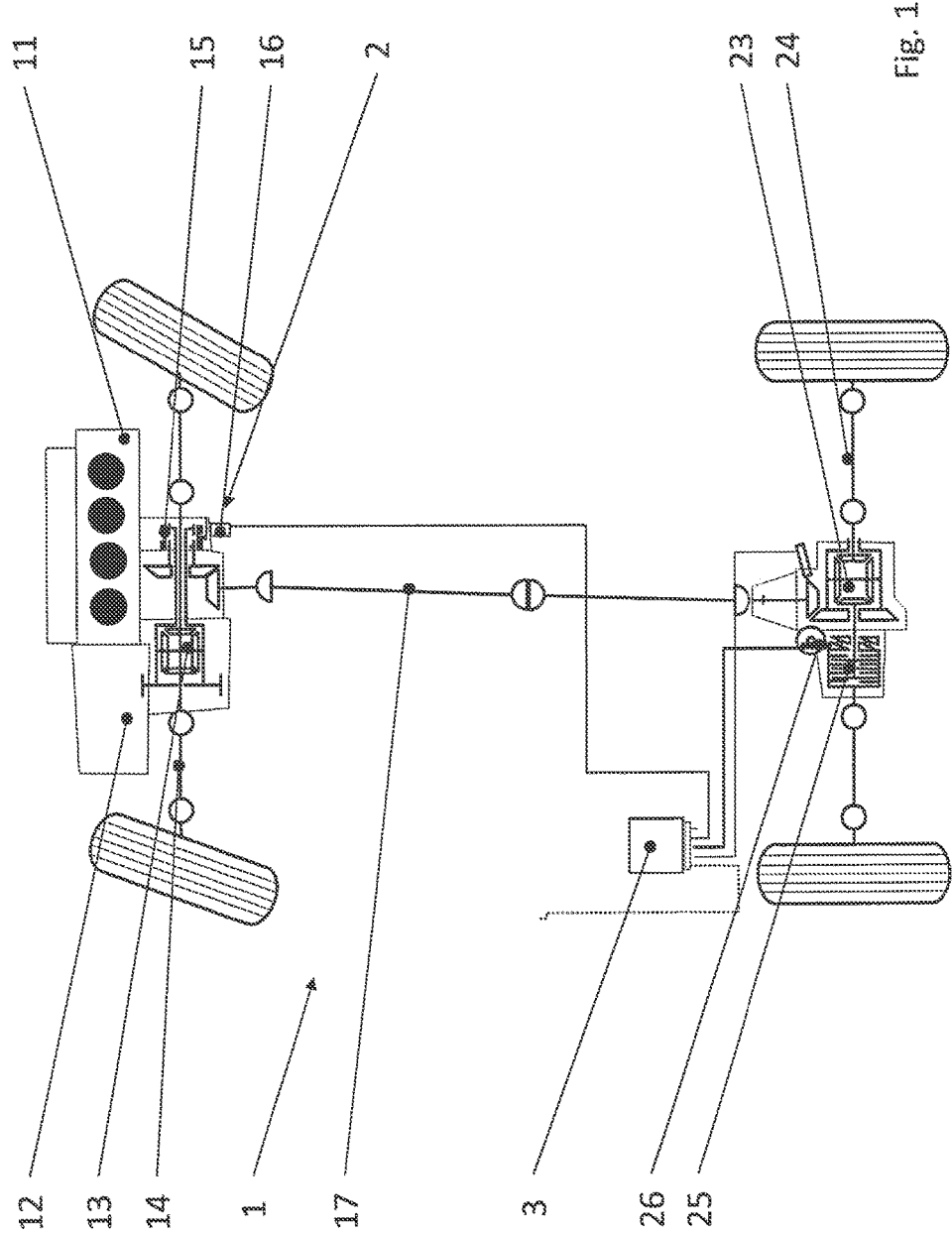
FIG. 1 is a schematic illustration of a motor vehicle according to the invention with a motor in a transverse construction.

FIG. 1 illustrates a schematic view of a motor vehicle according to the invention operated in all-wheel drive at times. The motor vehicle 1 comprises in particular a drive unit 11 which is designed as an internal combustion engine, is in a transverse construction and is connected via a transmission 12 and a differential transmission 13 to a PTU 2. The PTU 2 has a disconnect clutch 15 which is actuable by a first actuating unit 16. The differential transmission 13 is connected to the primary drive axle 14, wherein the primary drive axle 14 is permanently driven. The disconnect clutch 15 is preferably designed as a dog clutch. The PTU 2 is connected to a torque transmission train 17. The torque transmission train 17 is connected to a further differential housing 23. The differential housing 23 has a second clutch device 25, designed as a hang-on clutch, which is connectable to the secondary drive axle 24. The actuation of the hang-on clutch 25 takes place by means of a second actuating unit 26, wherein the first actuating unit 16 and the second actuating unit 26 are preferably actuated electromagnetically, electromechanically or hydraulically. The actuating of the two actuating units 16, 26 takes place by means of a control unit 3 which, on the basis of a multiplicity of sensors, switches (not illustrated) and other input information, determines a driving state or a driving state which can be anticipated.

Figure 2:
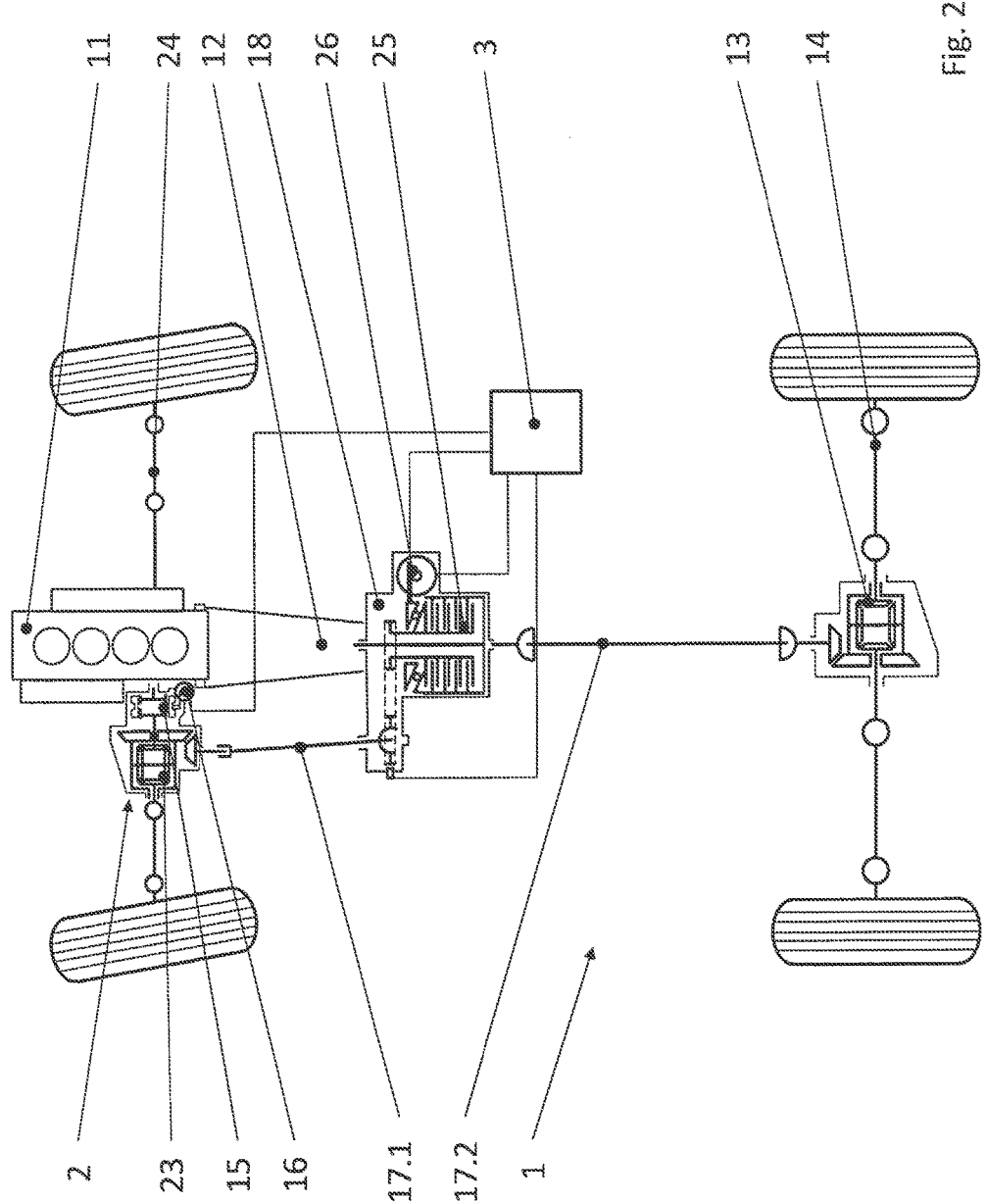
FIG. 2 is a schematic illustration of a motor vehicle according to the invention with a motor in a longitudinal construction.

A motor vehicle 1 operated in all-wheel drive at least at times, with a drive unit 11, in a longitudinal construction, is illustrated in FIG. 2. In this arrangement, a drive unit 11 designed as an internal combustion engine and the transmission 12 are installed in the longitudinal direction of the vehicle. A distribution transmission 18 which is designed to distribute the driving force to the primary drive axle 14 and to the secondary drive axle 24 is arranged after the transmission 12, wherein, in the case of this construction of the motor, the primary drive axle 14 is the rear axle, and the secondary drive axle 24 is the front axle. The torque transmission train 17.1 connects the distribution transmission 18 in an articulated manner to the secondary drive axle 24 and the torque transmission 17.2 to the primary drive axle 14. The distribution transmission 18 has a second clutch device 25, also called an on-demand clutch. The on-demand clutch 25 has a second actuating unit 26, wherein the second actuating unit 26 is actuated by the control unit 3. When the on-demand clutch 25 is actuated, the torque transmission train 17.1 is presynchronized with the primary drive axle 14. During synchronization, the dog clutch located in the PTU 2 is closed and the secondary drive axle 24 is driven. The PTU 2 is arranged in the region of the differential transmission 23 of the secondary drive axle 24.

FIG. 3 illustrates a flow diagram of a control method known from the prior art. In order to calculate the all-wheel requirement, signals, information and parameters in the form of vehicle data D, external information I and preceding events E are detected in the control unit 3 and the calculation of the all-wheel requirement B1 is carried out therefrom. On the basis of this information, the all-wheel requirement W1 for the connection of a secondary drive axle 24 is determined and classified in two categories, 2WD and 4WD. If, in the evaluation, the first category 2WD is determined, the motor vehicle 1 is switched into two-wheel operation or maintained therein if the motor vehicle 1 was already in the two-wheel mode. If the evaluation determines the third category 4WD, the secondary drive axle 24 is switched together with the primary drive axle 14 into the all-wheel operation by connection of the second clutch device 25 and closing of the disconnect clutch 15.

FIG. 4 illustrates a flow diagram of the improved control method according to the invention. While, in order to determine and calculate the probability of the all-wheel requirement B2, essentially the same signals, information and parameters in the form of vehicle data D, external information I and preceding event E are used as in FIG. 3, in determining the all-wheel requirement W2, a further category VS is taken into consideration in which an all-wheel operation is prepared, but the disconnect clutch is not closed and is therefore not yet repositioned for all-wheel operation.

FIG. 5 illustrates a more detailed flow diagram of a control method according to the invention. It shows that the second category VS is divided into two phases Ph1, Ph2. According to the invention, a probability, which can be expected, of the all-wheel requirement B2 is precalculated in two phases, wherein, in a first phase Ph1, the air gap in the hang-on clutch 25 is passed through. In the event of "higher" probability of the all-wheel requirement W2, in a second phase Ph2 presynchronizing of the secondary drive axle 24 and of the torque transmission train 17 with the primary drive axle 14 is carried out, while keeping the disconnect clutch 15 open. When the third category 4WD is determined, the presynchronization has essentially already taken place and in principle only the disconnect clutch 15 is still closed, in order to produce the all-wheel drive.

LIST OF REFERENCE SIGNS

1 Motor vehicle
2 Power-transfer unit (PTU)
3 Control unit
11 Drive unit
12 Transmission
13 Differential transmission
14 Primary drive axle
15 Disconnect clutch
16 First actuating unit
17 Torque transmission train
17.1 Torque transmission train
17.2 Torque transmission primary drive axle
18 Distribution transmission
23 Differential transmission
24 Secondary drive axle
25 Second clutch device
26 Second actuating unit
D Vehicle data
I External information
E Preceding events
B1 Calculation of all-wheel requirement
B2 Calculation of all-wheel requirement
W1 Decision depending on all-wheel requirement
W2 Decision depending on all-wheel requirement
2WD Low category (2WD)
VS Medium category (preparation)
4WD High category (4WD)
Ph1 Medium1 category (first preparation)
Ph2 Medium2 category (second preparation)

The invention claimed is:

1. A method for controlling a motor vehicle operated in all-wheel drive at times, by means of a control unit, wherein the motor vehicle comprises a drive unit, a primary axle permanently driven by the drive unit, a secondary drive axle, a torque transmission train for transmitting torque from the drive unit to the secondary axle, and a disconnect clutch for coupling the secondary drive axle to the drive unit and uncoupling the secondary drive axle from the drive unit, wherein the control unit is configured to actuate the disconnect clutch via a first actuating unit, the method comprising:
    determining an all-wheel requirement for the motor vehicle from input signals; and
    If there is a predetermined all-wheel requirement, preparing an all-wheel operation, wherein the disconnect clutch is not closed;
    wherein the determination of the all-wheel requirement includes determining a probability of an all-wheel requirement in at least three categories, namely "low," "medium" and "high", and the predetermined all-wheel requirement corresponds to the "middle" category;
    wherein, in the "low" category, the disconnect clutch is open or remains open.

2. The method as claimed in claim 1, wherein the motor vehicle comprises a second clutch device for presynchronizing the torque transmission train, wherein the control unit can actuate the second clutch device via a second actuating unit, wherein the preparation of the all-wheel operation takes place via the second actuating unit.

3. The method as claimed in claim 1, wherein in the "high" category, the disconnect clutch remains closed or, if this has not yet taken place, the all-wheel operation is prepared and the disconnect clutch is closed.

4. The method as claimed in claim 1, wherein the preparation of the all-wheel operation takes place in such a manner that presynchronizing of the torque transmission takes place.

5. The method as claimed in claim 2, further including presynchronizing by closing the second clutch device to at least partially transmit rotary movement from the secondary drive axle to the torque transmission train.

6. The method as claimed in claim 2, further including presynchronizing by closing the second clutch device to at least partially transmit rotary movement from the drive unit to the torque transmission train.

7. The method as claimed in claim 1, wherein the preparation of the all-wheel operation takes place in such a manner that a motor-pump unit for actuating the second clutch device is started.

8. The method as claimed in claim 1, wherein the determination of the all-wheel requirement includes determining a probability of the all-wheel requirement in at least four categories, namely "low", "medium1", "medium2" and "high", wherein, if the "medium1" or "medium2" category is present, different steps are carried out for preparing an all-wheel operation, and the disconnect clutch is in each case not closed.

9. The method as claimed in claim 8, wherein, if the "medium1" category is present, passage through an air gap takes place or a motor-pump unit is started, and, if the "medium2" category is present, presynchronizing of the torque transmission train takes place.

10. The method as claimed in claim 1, wherein the input signals for determining the all-wheel requirement of the motor vehicle comprise actual data of the vehicle, in particular wheel rotational speeds, a steering angle, a yaw rate, a roll angle, a pitch angle, lateral acceleration, longitudinal acceleration, a position of a driving mode switch, a position of an ESC/ASR/ASC/ABS/ESP switch, a gas pedal position, a brake pedal position, an ambient temperature, a position of a cruise control switch, data from a distance radar, a transmission shift position, a throttle position, an engine speed or an engine torque.

11. The method as claimed in claim 1, wherein the input signals for determining the all-wheel requirement for the motor vehicle comprise external information, such as data from car-to-car communication and/or internet or satellite data.

12. The method as claimed in claim 1, wherein the input signals for determining the all-wheel requirement for the motor vehicle comprise temporally preceding driving events.

13. The method as claimed in claim 1, wherein the disconnect clutch is designed as a dog clutch.

14. The method as claimed in claim 2, wherein the second clutch device is designed as a multi-disk clutch.

15. The method as claimed in claim 2, wherein the second clutch device is designed as a dog clutch.

16. The method as claimed in claim 2, wherein the second clutch device is designed as a switchable differential.

17. A motor vehicle with a control unit, the motor vehicle comprising:
a drive unit, a primary drive axle permanently driven by the drive unit, a secondary drive axle, a torque transmission train for transmitting torque from the drive unit to the secondary drive axle, and a disconnect clutch for coupling the second drive axle to the drive unit and for decoupling the second drive axle from the drive unit, wherein the control unit can actuate the disconnect clutch via a first actuating unit, wherein the control unit is configured to determine an all-wheel requirement for the motor vehicle from input signals; and if there is a predetermined all-wheel requirement, prepare an all-wheel operation, wherein the disconnect clutch is not closed, wherein determining the all-wheel requirement includes determining a probability of an all-wheel requirement in at least three categories, namely "low," "medium" and "high", and the predetermined all-wheel requirement corresponds to the "middle" category, and wherein, in the "low" category, the disconnect clutch is open or remains open.

18. The motor vehicle as claimed in claim 17, further including a second clutch device for presynchronizing the torque transmission train, wherein the control unit can actuate the second clutch device via a second actuating unit.

19. The method as claimed in claim 4, wherein the presynchronizing takes place by closing the second clutch device, a rotational speed is at least partially transmitted from the secondary drive axle to the torque transmission train.

20. The method as claimed in claim 4, wherein the presynchronizing takes place by virtue of the fact that, by closing the second clutch device, a rotational speed is at least partially transmitted from the drive unit to the torque transmission train.

21. A method for controlling a motor vehicle operated in all-wheel drive at times, with a control unit, wherein the motor vehicle comprises a drive unit, a primary drive axle permanently driven by the drive unit, a secondary drive axle, a torque transmission train for transmitting torque from the primary drive axle to the secondary drive axle, and a disconnect clutch moveable between a closed position coupling the primary drive axle and the torque transmission train and an open position uncoupling the primary drive axle and the torque transmission train, wherein the control unit is configured to move the disconnect clutch between the closed and open positions via a first actuating unit, the method comprising:

determining an all-wheel requirement for the motor vehicle from input signals, wherein determining the all-wheel requirement includes determining one of a plurality of probability categories of the all-wheel requirement; and maintaining the disconnect clutch in the open position with the first actuating unit or moving the disconnect clutch to the open position with the first actuating unit and preparing an all-wheel operation in response to a determination that the probability category is a predetermined one of the plurality of probability categories.

22. The method as set forth in claim 21 wherein the probability categories include a low probability category, a medium probability category and a high probability category, wherein the predetermined all-wheel requirement corresponds to the medium probability category, and wherein the method further includes maintaining the disconnect clutch in the open position with the first actuating unit or moving the disconnect clutch to the open position with the first actuating unit in response to a determination that the probability category is the low probability category, and maintaining the disconnect clutch in the open position with the first actuating unit or moving the disconnect clutch to the open position with the first actuating unit with the first actuating unit and preparing the all-wheel operation in response to a determination that the probability category is the medium probability category.

23. The method as set forth in claim 21 wherein preparing the all-wheel operation includes closing a second clutch device that selectably couples the secondary drive axle and the torque transmission train to at least partially transmit rotary movement from the secondary drive axle to the torque transmission train.

* * * * *